United States Patent [19]

Kim

[11] 4,235,605
[45] Nov. 25, 1980

[54] SYNTHESIZING GAS FROM COAL VIA SYNERGETIC REACTIONS WITH STEAM AND SULFUR

[75] Inventor: Chi S. Kim, Cambridge, Mass.

[73] Assignee: Avco Corporation, Wilmington, Mass.

[21] Appl. No.: 7,344

[22] Filed: Jan. 29, 1979

[51] Int. Cl.³ .................................................. C10J 3/00
[52] U.S. Cl. ..................................... 48/202; 423/563; 423/573 R; 423/415 A; 423/648 R; 48/203; 48/206
[58] Field of Search .................... 48/197 R, 203, 206, 48/202; 423/363, 648 R, 573 R, 569, 573 G, 572, 564, 415 A

[56] References Cited

U.S. PATENT DOCUMENTS

| | | | |
|---|---|---|---|
| 2,654,664 | 10/1953 | Reichl et al. | 48/203 |
| 2,864,677 | 12/1958 | Eastman et al. | 48/197 R |
| 2,963,348 | 12/1960 | Sellers | 48/192 R |
| 2,984,548 | 5/1961 | Massey | 423/648 R |
| 4,066,739 | 1/1978 | Chen | 423/648 R |
| 4,146,580 | 3/1979 | Beavon | 423/564 |
| 4,147,762 | 4/1979 | Steiner | 423/564 |

FOREIGN PATENT DOCUMENTS 157323 12/1951 Australia .............................. 423/573 L

OTHER PUBLICATIONS

"Removal and Reduction of Sulfur Dioxides from Polluted Gas Streams" by Steiner et al., 1975, pp. 180–191.
"Catalytic Decomposition of Hydrogen Sulphide" by Fukuda et al. *Ind. Eng. Chem. Fund.*, vol. 17(4), 1978, pp. 243–247.

*Primary Examiner*—S. Leon Bashore
*Assistant Examiner*—Michael L. Goldman
*Attorney, Agent, or Firm*—Abraham Ogman

[57] ABSTRACT

Gasification by reaction of carbon (e.g., in coal) with sulfur in the presence of steam, at 500°–1500° K., and controlled to favor production of carbon monoxide/dioxide and hydrogen sulfide (further reactable to hydrogen and sulfur, which can be recycled). Heat generated by combustion of reaction products and/or through possible exothermic portions of the process can be utilized in the process for preheating reagents or reducing energy requirements of the main reaction.

6 Claims, 7 Drawing Figures

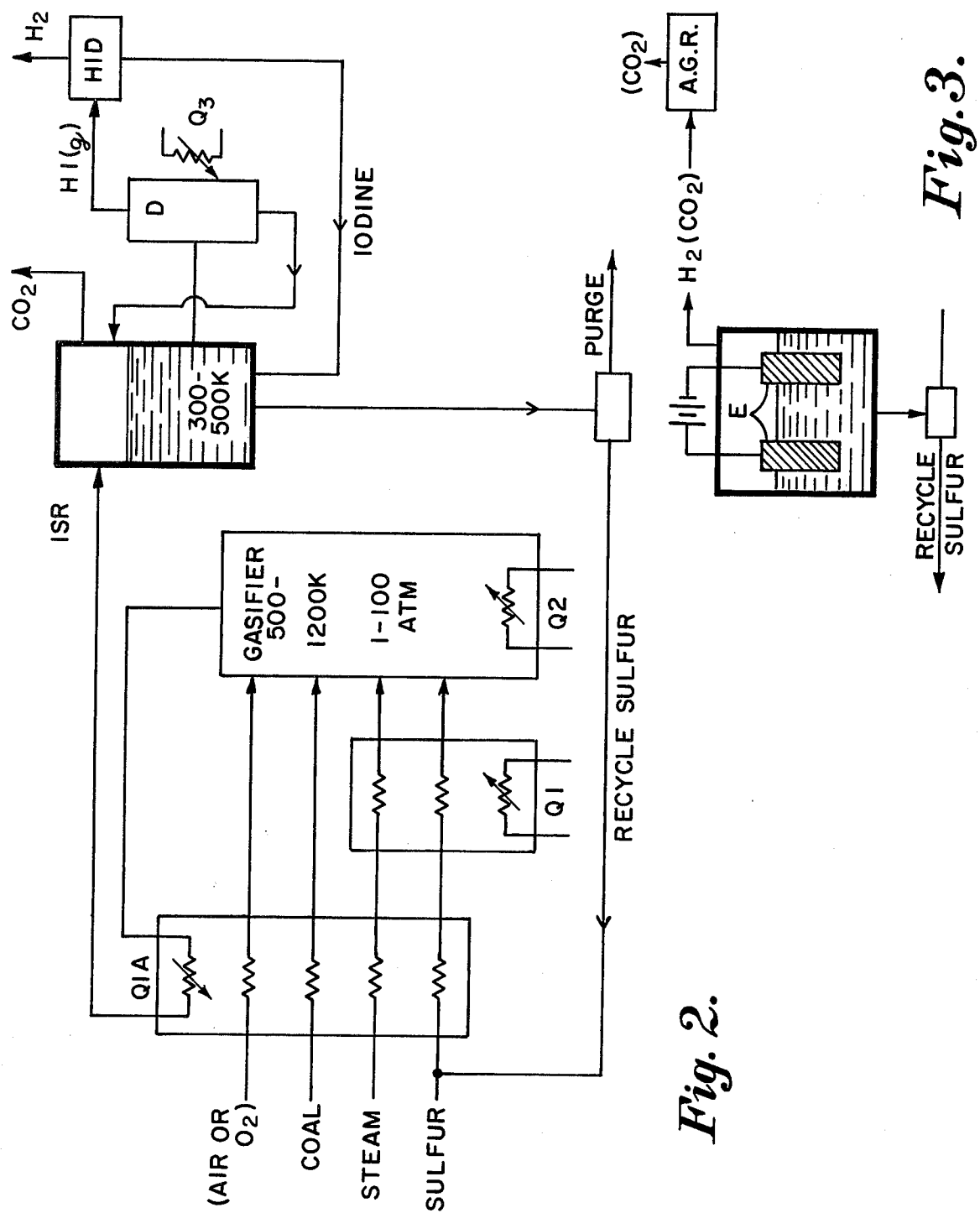

SYNTHESIZING GAS FROM COAL VIA SYNERGETIC REACTIONS WITH STEAM AND SULFUR

BACKGROUND OF THE INVENTION

The present invention relates to the production of combustible gas or the like (e.g., synthetic compositions similar to natural gases usable as an industrial reactant or nonburning gas or as a combustant). In the prior art, most coal gasification processes rely on the reaction of coal or char with steam to generate the necessary hydrogen in a reaction essentially as follows:

$$C + H_2O(g) \rightarrow CO + H_2 \quad \Delta H_R(1200° K.) = 32.457° K. \text{ cal/g mole} \qquad \text{I.}$$

The equilibrium constant of the above reaction becomes larger than 1 ($K_p > 1$) only when the temperature exceeds 947° K. The reaction is highly endothermic and its rate becomes fast enough to be practical only above 1220° K. The high energy requirement at such high temperatures can be met, as practiced in most coal gasification processes, by partial combustion of coal (or char) using high-purity oxygen.

The heat may be supplied by external heat exchangers, but only at the disadvantage of low throughput due to the limited rate at which heat can be supplied through the walls to the reactants. In addition, the very high operating temperature will require (at a prohibitive cost) exotic materials in the construction of the gasification vessels. Furthermore, the fusion of ash around 1400°–1500° K. can seriously hinder a successful operation of such heat exchangers which must be operated above 1400° K. to obtain practical gasification rates. Heat supply by recirculating melt or inert solids which can be heated in a vessel separate from the gasification vessel can substantially increase the heat transfer rates, but still retains many of the problems associated with very high temperature operations.

The heat for the steam-carbon reaction can be also supplied internally from the reaction of CaO with $CO_2$ which is one of the gasification products. Simultaneous removal of undesired $CO_2$ as $CaCO_3$ further encourages the formation of $H_2$. Although this process is conceptually ideal, it poses many technical problems inherent to gas-solid reactions at high temperature.

It is therefore a principal object of the invention to provide a coal gasification process with reduced energy requirements and/or reduced oxygen requirements compared to the prior art processes.

It is a related object of the invention to provide such gasification process operating at generally lower temperatures and a wide range of pressure compared to the prior art processes.

It is a further object of the invention to utilize heat available in reaction steps and/or as sensible heat in one or more of the reaction products to provide all or a portion of the input energy requirement of the process, consistent with one or more of the preceding objects.

It is a further object of the present invention to provide such a process which can accept lower cost coal, particularly high sulfur/coal.

SUMMARY OF THE INVENTION

In accordance with the present invention, coal and steam are reacted together with substantial amounts of sulfur provided externally and possibly supplemented by a high sulfur content of the coal itself (when high sulfur coal is available as a low cost feed stock).

The resulting reaction at very different concentrations of reagent is:

$$C + H_2O + 0.25S_2 \rightarrow CO + 0.5H_2 + 0.5 H_2S$$
$$\Delta H_R(1200° K.) \rightarrow 21.639 \text{ cal/g mole C.} \qquad \text{II.}$$

Temperature at which $K_p > 1$ is above about 780° K.

$$0.5C + H_2O + S \rightarrow 0.5CO_2 + H_2S \quad \Delta H_R(800° K.) = -9.6° K. \text{ cal (i.e., exothermic)} \qquad \text{III.}$$

$$K_p \simeq 1000$$

The equilibrium compositions are calculated for 1 atm reactor pressure as an illustration; although low pressure operation is preferred generally, high pressure operation can sometimes be more economical due to reduced process gas volume.

It can be seen that the energy requirements are substantially less through the present invention than in the prior art, and that temperature requirements are lower. The heat requirement of endothermic reaction II is only ⅔ that of prior art reaction I and reaction III is exothermic. Also reaction rate of II can be very fast due to the synergetic reaction of sulfur with both carbon and steam. Indirect, but meaningful corroboration of the presently described invention can be found in the journal article by Steiner et al, "Removal and Reduction of Sulfurdioxides from Polluted Gas Streams" in the book, *Sulfur Removal and Recovery from Industrial Processes*, (Pfeiffer Ed., American Chem. Soc.—No. 139-1975) pages 180-191. In the work described in that article, sulfur dioxide was converted to elemental sulfur or hydrogen sulfide by treating it with steam and coal. Remarkably, the conversion of sulfur dioxide to hydrogen sulfide was almost complete in most cases, even though reaction time was limited to less than 6 seconds and reaction temperatures were between 550° C. and 800° C. Were sulfur dioxide and steam reacted individually with coal, the reaction temperature would have been required to be substantially higher to obtain such a fast reaction rate. The conversion of sulfur dioxide to $H_2S$ by reacting it with steam and coal involves more reaction steps than that of sulfur as the former has to be reduced first to the latter before it is further reduced to $H_2S$.

In accordance with the present invention, the introduction of sulfur into a coal-steam reaction is being made to facilitate coal gasification at substantially lower temperatures and would be practical for the reaction of coal with steam alone.

The major reaction product produced through the present invention, hydrogen sulfide, can be converted to water and sulfur through the following reaction:

$$\tfrac{1}{3} H_2S + \tfrac{1}{2} = \tfrac{1}{3} H_2O + \tfrac{1}{3} SO_2 \qquad \text{IVA.}$$
$$+ \tfrac{2}{3} H_2S + \tfrac{1}{3} SO_2 = \tfrac{2}{3} H_2O + S \qquad \text{IVB.}$$

$$\text{NET } H_2S + \tfrac{1}{2} O_2 = H_2O (g) + S (s) \quad \Delta H_R° (298° K.) = -52.9° K. \text{ cal} \qquad \text{IV.}$$

or converted to hydrogen and sulfur via hydrogen halide (e.g., hydrogen iodide) as follows:

$$H_2S + I_2 = 2HI + S \qquad \text{VA.}$$
$$2HI = H_2 + I_2 \qquad \text{VB.}$$

$$\text{NET } \overline{H_2S = H_2 + S} \quad \Delta H_R^\circ (298^\circ K.) = +4.88^\circ K. \text{ cal} \qquad V.$$

The elemental sulfur produced through either of reactions IV of V can be recycled through the coal gasification step. The heat generated by reaction IV can be utilized to supply reaction energy for the basic gasification step (e.g., reaction II above and/or for preheating or reagents).

It is also possible to thermally decompose hydrogen sulfide directly to hydrogen and sulfur on catalysts. Recently, Ferkuda et al [K. Ferkuda, M. Dokiya, T. Kamsyama, and Y. Kotera, "Catalytic Decomposition of Hydrogen Sulfide," *Ind. Eng. Chem. Fundam.*, 17 (4), pp. 243-248 (1978)] was able to convert catalytically more than 95 percent of the hydrogen sulfide fed to the reaction system into hydrogen and sulfur by continuous removal of sulfur and intermittent separation of hydrogen from the reaction gas mixture at 800° C. The separation of the reaction products is desirable because the equilibrium conversion of hydrogen sulfide is very low at practically attainable temperatures, for example, below 1000° C.

Instead of converting hydrogen sulfide to sulfur, it is alternatively within the scope of the present invention to burn part of the hydrogen sulfide as a means of extracting energy by using the combustion gases to drive a gas turbine or other prime mover and/or treating combusted gases with the uncombusted hydrogen sulfide to convert any sulfur dioxide in the combustion gases to elemental sulfur. Although an engine or other means of extraction of energy from combustion hydrogen sulfide faces difficult corrosion problems inherent in dealing with sulfur and its compounds, these problems can be minimized by optimizing process operating conditions and in selection of sulfur resistant materials in final parts.

Compared to conventional methods of gasifying coal, the present invention, described in its essentials above, has the advantages mentioned above, including possibility of utilization of high sulfur coal, lower temperature conditions compared to prior art processes, reduction or elimination of oxygen requirements, higher efficiency, and lower operating and capital costs.

These and other objects, features, and advantages of the invention will be apparent from the following detailed description with reference therein to the accompanying drawing in which:

BRIEF DESCRIPTION OF THE DRAWING

FIGS. 2–5 are block diagrams for practice of the processes of the invention, or portions thereof, in accordance with preferred embodiments of the invention.

DETAILED DESCRIPTION OF PREFERRED EMBODIMENTS

Figure 1A:
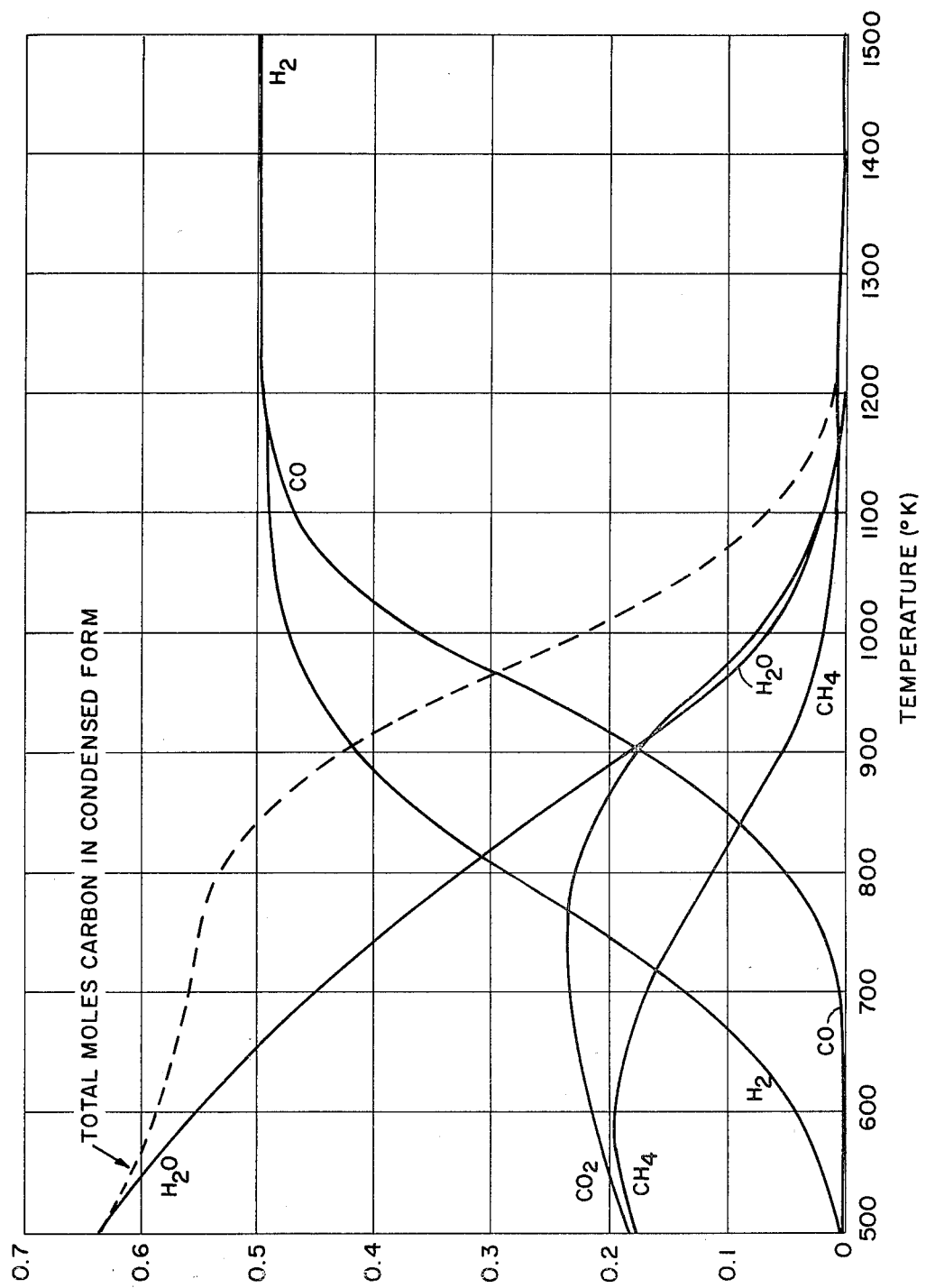
FIGS. 1A–1C are graphs of reaction products vs. temperature for reactions in accordance with the prior art (FIG. 1A) and different embodiment of the present invention (FIGS. 1B and 1C).
Figure 1B:
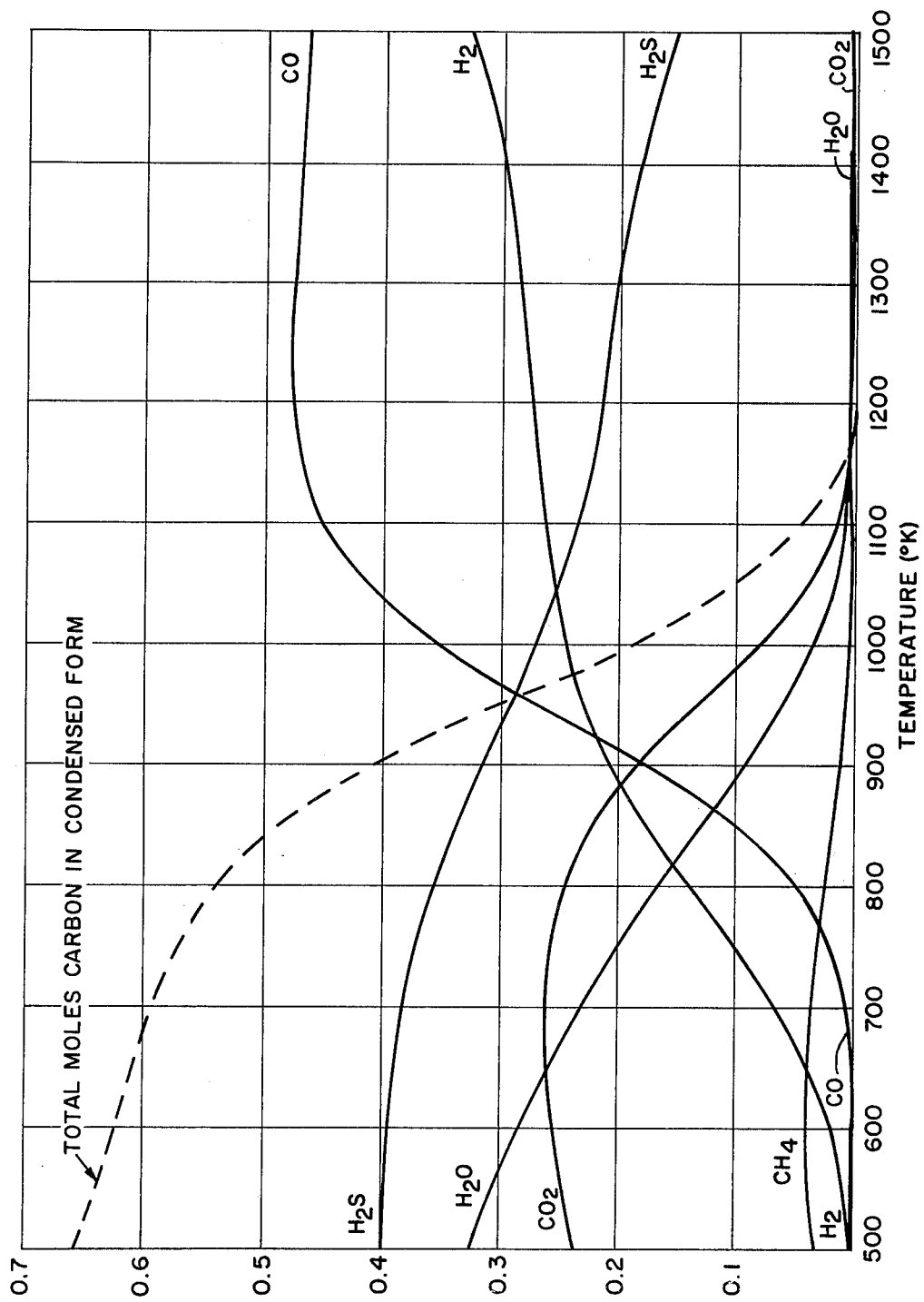
Figure 1C:
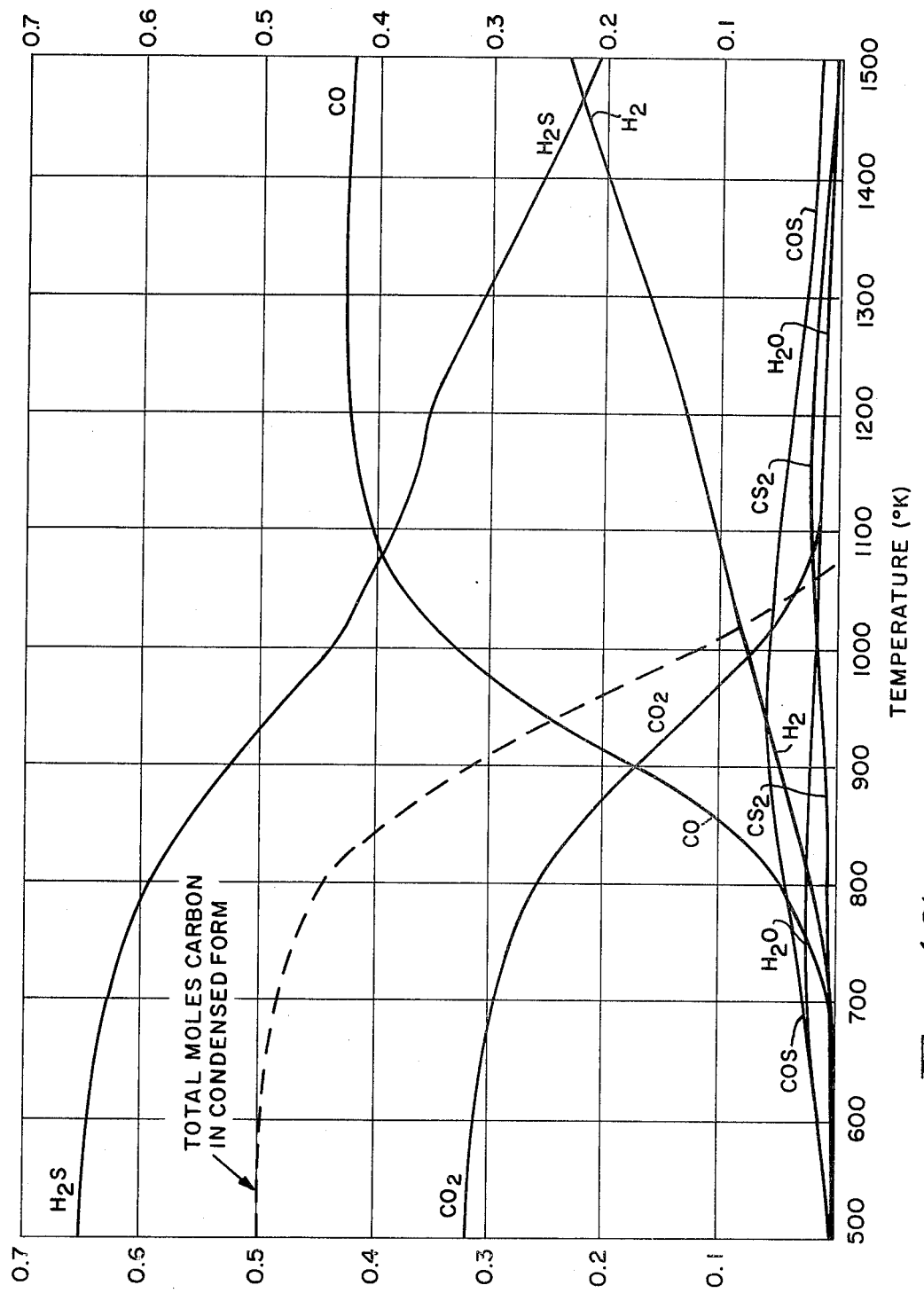

FIGS. 1A, 1B, and 1C show graphs for the reactions respectively, of I, II, and III above, at atmospheric pressure (in all cases, at 1100°–1500° K.) whereby equal amounts of carbon monoxide and hydrogen are produced in the prior art (I) coal-steam reaction, while negligible amounts of other products or initial reagent carbon are present at such temperatures. At lower temperatures (900°–1100° K.), substantially higher amounts of unreacted steam and carbon, as well as carbon dioxide, remain. In the FIG. 1B graph made in the same 900°–1100° K. range, high amounts of hydrogen, carbon monoxide, and hydrogen sulfide are present for the reaction: $C + H_2O + 0.5S$. In FIG. 1C involving the reaction $C + H_2O + S$, the amount of hydrogen sulfide is enhanced at this lower temperature range at the expense of hydrogen content.

Bearing in mind these quantitative considerations, the following block diagrams of embodiments of the process of the present invention are set forth.

FIG. 2 illustrates a process in which coal, steam, and sulfur are preheated first by heat exchange with products of reaction (described below) and then further as indicated at Q1A and by external heat input as indicated at Q1, and then injected into a gasifier when the reagents are at temperatures in the range of 500°–1200° K., there reacted for a sufficiently long time to produce production quantities of hydrogen sulfide and carbon dioxide through equation II above. In this temperature range, $H_2S$ and $CO_2$ tend to be the predominant products although CO and $H_2$ do exist in significant concentrations in the upper part of the temperature range. The temperatures above which CO and $H_2$ become predominant depend on the gasification pressures, higher pressure generally favoring the formation of $H_2S$ and $CO_2$ over $H_2$ and CO. The required preheat temperature to provide sufficient energy for the gasification depends on the gasifier temperature and pressure, which may be adjusted to obtain optimum product composition, yield and reaction rates. If the preheat temperature is not high enough to supply all the gasification energy, the balance can be added to the gasifier as indicated at Q2.

Through the heat exchange of Q1A or other means, the temperature of the hydrogen sulfide and carbon dioxide is cooled down to about 300°–500° K. and then fed to a reactor containing an iodine solution for operation of reaction of IV above and its component reactions IVA and IVB.

Carbon dioxide is taken off as a product gas from the iodine solution reactor ISR and the solution itself is cycled to a distillation column D producing hydrogen iodide as a gas which is taken to a hydrogen iodide decomposition reactor (with a catalyst therein, or electrodes for carrying out electrolysis of hydrogen iodide) to produce the decomposition products, gaseous hydrogen and either gaseous or condensed form of iodine, the latter for recycling to the iodine solution. Iodine is also produced in a distillation column and recycled directly to the reactor ISR. Sulfur is also produced and taken off for recycling (after purging) to the sulfur input to the gasifier.

FIG. 3 illustrates a partial alternative to the FIG. 2 process wherein the gasifier, preheater and heat exchanger are the same as in FIG. 2, but wherein the iodine solution vessel comprises electrodes E for carrying out an electrolysis process to produce hydrogen and sulfur. The hydrogen may be mixed with carbon dioxide, depending on the feed stock obtained. The gas products may be taken to an acid gas remover reactor AGR, known per se, to produce separate hydrogen and carbon dioxide product streams, if necessary.

Figure 4:
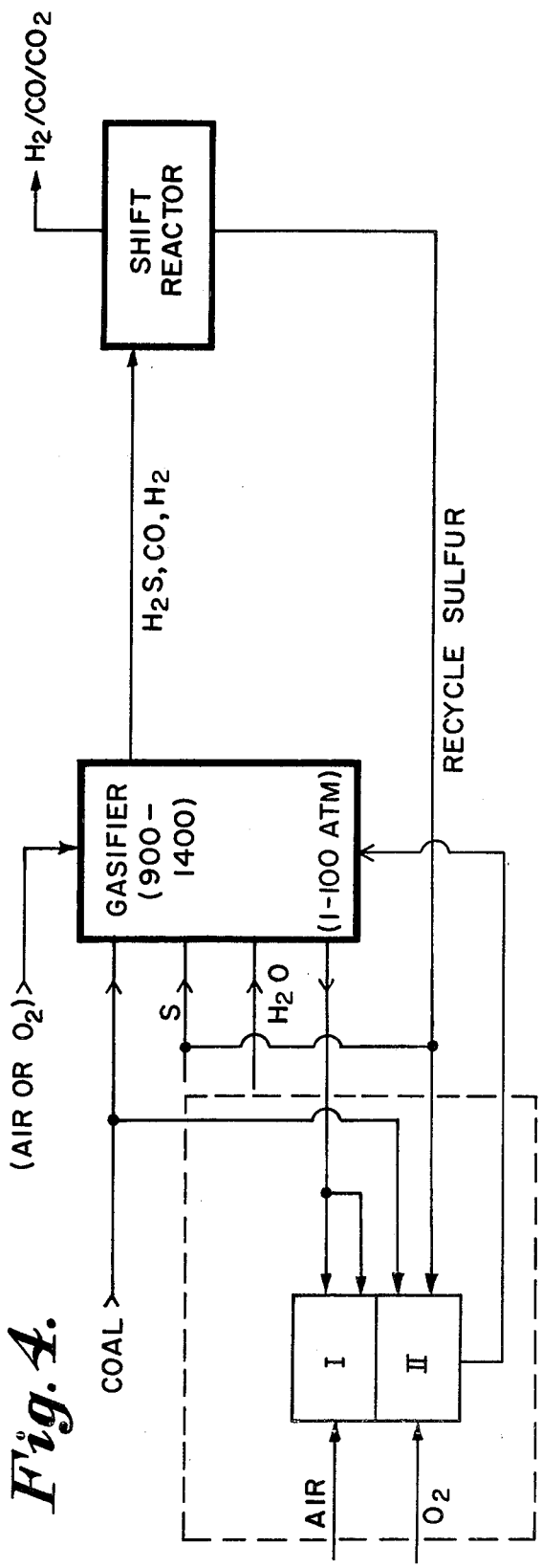

FIG. 4 illustrates a similar process (to FIG. 2 or 3) utilizing higher temperatures in the gasifier (900°–1400° K.), but significantly lower than the prior art nonsulfur processes and producing hydrogen sulfide, carbon monoxide, and hydrogen which are passed to reactor of the type indicated in the FIG. 2 or the FIG. 3 process for producing gaseous products: hydrogen, carbon monoxide, and carbon dioxide and recyclable or otherwise reusable sulfur. FIG. 4 also illustrates that char from the gasifier can be combusted with air or oxygen to provide heat for utilization intrinsically in the process or externally. Similarly, feed stock coal and/or feed stock sulfur can be burned with air or oxygen for the same purposes. Even if the gasifier is operated in an exothermic mode as indicated above, it would be appreciated that the overall process is endothermic, but that the necessary heat production is readily integrated with the supply of feed stock to the gasifier and/or recycling of sulfur.

It is also indicated in FIG. 4 that the reactor receiving the hydrogen sulfide, carbon monoxide, and hydrogen products of the gasifier can be of the shift reaction type to produce additional hydrogen before separation of hydrogen sulfide and other sulfur compounds.

Figure 5:
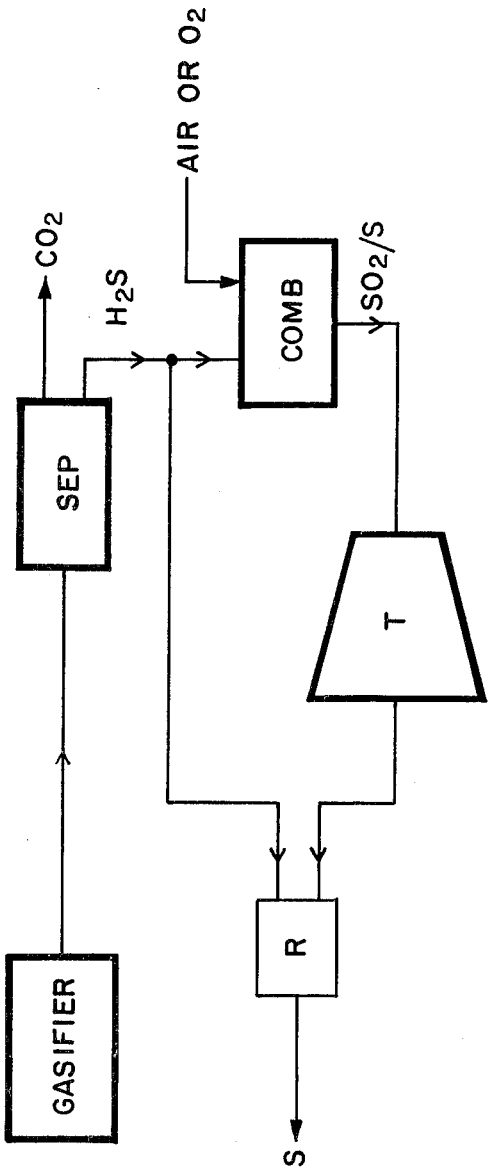

FIG. 5 illustrates that the gasifier can provide its products to a separation reaction SEP which provides hydrogen sulfide of sufficient purity to be fed to a combustion chamber which is also fed with air or oxygen to produce sulfur and sulfur dioxide for driving a turbine T. The combustion products are reacted with uncombusted hydrogen sulfide to produce sulfur which is recyclable as in one or more of the previously described embodiments. The hydrogen sulfide is an easily combustible gas of relatively high calorific value and the process as indicated in FIG. 5 has considerable advantage by the provision of motive power for the turbine (to drive a generator or other load) compared to storage or long range transportation of combustible gas as produced in the other embodiments for ultimately performing a similar motive power function.

It is evident that those skilled in the art, once given the benefit of the foregoing disclosure, may now make numerous other uses and modifications of, and departures from the specific embodiments described herein without departing from the inventive concepts. Consequently, the invention is to be construed as embracing each and every novel feature and novel combination of features present in, or possessed by, the apparatus and techniques herein disclosed and limited solely by the scope and spirit of the appended claims.

What is claimed is:

1. Coal gasification process comprising the reaction of feedstocks consisting essentially of steam, coal and elemental sulfur to produce carbon monoxide and hydrogen sulfide, the reaction being carried out at 500°–1500° K. and under relative concentration and supply rates of feedstocks such that the mole ratio of C:H$_2$O:S shall be in the range of 1:1:0.5 to 0.5:1:1 to produce carbon monoxide and hydrogen sulfide.

2. Process in accordance with any of claim 1 wherein the source of at least a portion of the coal is high sulfur coal.

3. Process in accordance with any of claim 1 wherein the coal is continuously fed into the process as a slurry.

4. Coal gasification process in accordance with any of claim 1 wherein heat is extracted from products of the reaction and utilized to preheat one or more of the feed stock materials.

5. Coal gasification process in accordance with claim 1 wherein reaction energy is supplied by burning at least one of a feed stock coal and/or a feed stock sulfur with air in a gasifier vessel wherein said gasification reaction is carried out.

6. Coal gasification process in accordance with claim 1 wherein reaction energy is supplied by burning at least one of a feed stock coal and/or a feed stock sulfur with oxygen is a gasifier vessel wherein said gasification reaction is carried out.

* * * * *

UNITED STATES PATENT AND TRADEMARK OFFICE
CERTIFICATE OF CORRECTION

PATENT NO. : 4,235,605
DATED : November 25, 1980
INVENTOR(S) : Chi S. Kim

It is certified that error appears in the above-identified patent and that said Letters Patent are hereby corrected as shown below:

Column 2, line 61, please insert the word "NET" over in the right-hand margin next to "IV".

Column 3, line 2, please insert the word "NET" over in the right-hand margin next to "V".

Column 6, line 35, please change "is" to ---in---.

Signed and Sealed this

Seventeenth Day of February 1981

[SEAL]

Attest:

RENE D. TEGTMEYER

Attesting Officer    Acting Commissioner of Patents and Trademarks